April 7, 1942. H. E. SOMES Re. 22,064

APPARATUS FOR HEAT TREATING GUN BORES

Original Filed Jan. 21, 1937 5 Sheets-Sheet 1

INVENTOR.
HOWARD E. SOMES.
BY John P. Farbox
ATTORNEY.

April 7, 1942. H. E. SOMES Re. 22,064
APPARATUS FOR HEAT TREATING GUN BORES
Original Filed Jan. 21, 1937 5 Sheets-Sheet 2
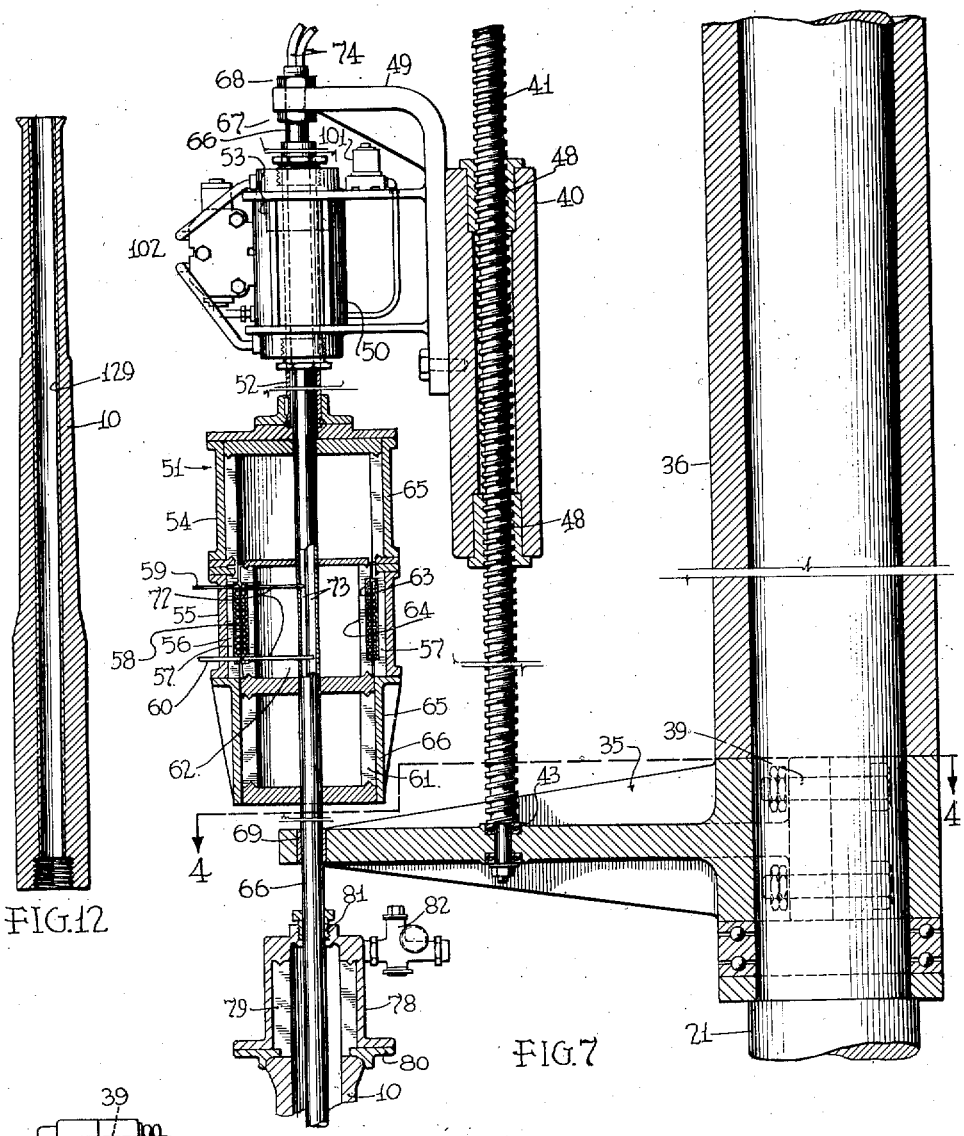
FIG. 12
FIG. 7
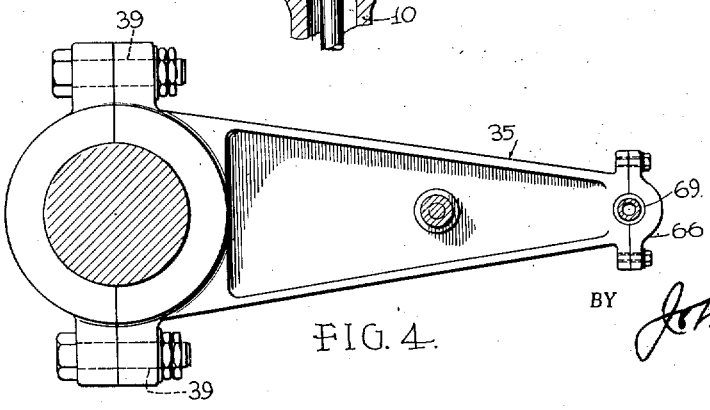
FIG. 4.
INVENTOR.
HOWARD E. SOMES
BY John P. Larbor
ATTORNEY.

April 7, 1942. H. E. SOMES Re. 22,064

APPARATUS FOR HEAT TREATING GUN BORES

Original Filed Jan. 21, 1937 5 Sheets-Sheet 3

INVENTOR.
HOWARD E. SOMES.
BY John P. Farley
ATTORNEY.

April 7, 1942. H. E. SOMES Re. 22,064

APPARATUS FOR HEAT TREATING GUN BORES

Original Filed Jan. 21, 1937 5 Sheets-Sheet 4

INVENTOR.
HOWARD E. SOMES.
BY John P. Harbor
ATTORNEY.

April 7, 1942. H. E. SOMES Re. 22,064

APPARATUS FOR HEAT TREATING GUN BORES

Original Filed Jan. 21, 1937 5 Sheets-Sheet 5

INVENTOR.
HOWARD E. SOMES.
BY John P. Tarbox
ATTORNEY.

Reissued Apr. 7, 1942

Re. 22,064

UNITED STATES PATENT OFFICE 22,064

APPARATUS FOR HEAT-TREATING GUN BORES

Howard E. Somes, Grosse Pointe Park, Mich., assignor to Budd Induction Heating, Inc., Philadelphia, Pa., a corporation of Michigan Original No. 2,208,607, dated July 23, 1940, Serial No. 121,598, January 21, 1937. Renewed April 7, 1939. Application for reissue July 22, 1941, Serial No. 403,590

23 Claims. (Cl. 266—4)

The title of this invention indicates the class to which it belongs. The figures of the drawings following show one embodiment of my invention. As usual it is susceptible of many others.

Fig. 4 is a plan view of the lower bracket arm.

Fig. 7 is a side view in vertical axial section of that portion of the apparatus lying within the rectangle 7 of Fig. 1, showing the switching transformer and tool carriage on an enlarged scale.

Fig. 12 is a longitudinal sectional view of a gun treated in accordance with the invention.

Figure 2:
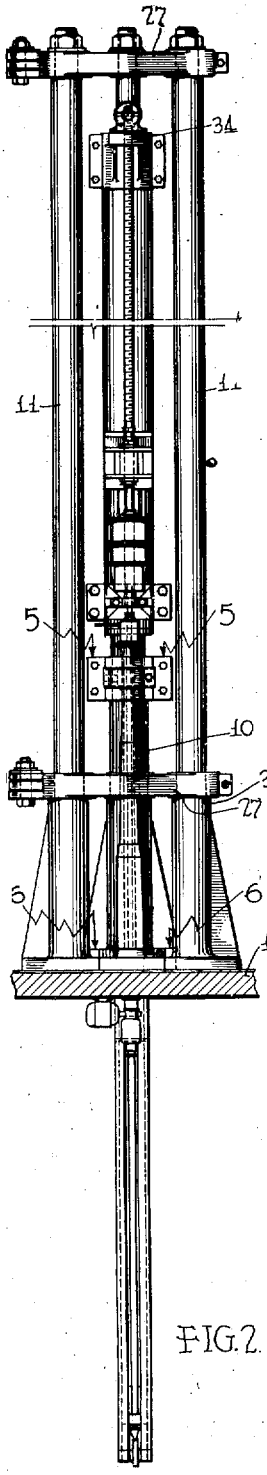
Fig. 2 is a front elevation at right angles to Fig. 1.

The central object of the invention is the achievement of an apparatus whereby the bore of a gun can be heat treated by high frequency induction. So far as I am aware this has never been achieved prior to my invention.

According to my invention there is generated in one axial region of the bore annular heating currents in and near the surface of the bore and of a determinate axial extent, progressively shift the currents so generated axially of the bore to circulate through successive axial portions of the bore, and as the currents are so shifted, quench the heat which has been generated by the currents so circulated and shifted. Preferably I uniformly progress the axially shifting currents which achieve the heating, and uniformly progress the quench of those heated portions from which the current has been shifted. Preferably during the process of shifting I maintain a determinate axial spaced relation between the zone traversed by the currents and the zone subjected to the following quench so that the zone of the bore which has been heated fully to quenching temperature will precede this space. From another angle it may be said that I prefer to maintain between the zone traversed by the progressing induced current and the zone being quenched a zone which has been heated to quenching temperature by the axial shifted current but momentarily free from substantial influence of either the shifting current or the quench. Preferably I begin the inducing of the treating current outside of the barrel and of an intensity and volume approximating that which shall be generated within the barrel and similarly end the inducing of current of similar intensity and volume at the opposite end of the gun, also outside of the barrel. The current, the inducing of which has so begun and so ended, is progressively shifted in the one case into one end of the barrel, and after being progressed throughout the extent of the bore is similarly shifted out of the opposite end thereof.

The apparatus comprises means to support the gun with free space substantially equal to its length disposed axially beyond each end thereof and freely accessible from the end. In the free space at one end is a mechanism for progressing into along, back along and again out of the bore of the gun a high frequency induction work coil of a dimension adapted to induce in the surface of the bore and in proper proximity thereto, the heating currents desired. Occupying the space at the opposite end of the gun is a mechanism for introducing to the bore progressing therealong, back therealong and then out again, a quenching head through which quenching fluid may be projected upon the heated bore to be quenched. Coordinated motor driving devices for these two devices, and an into-device spacing mechanism between the high frequency induction work coil and the quenching head insure their coordinated traverse of the bore of the gun from one end to the other in proper spaced relation. A chronometrically driven controller insures a coordinated activity of the various parts of these devices in their functional relations to each other individually and collectively. A means to introduce a dry inert gas under pressure to the bore being treated and progressing it under pressure between the high frequency induction coil and the bore and countered to the flow of the quenching medium prevents vaporized and sprayed quenching medium and other moistures from engaging upon the heated surfaces of the bore and thereby attains its treatment without marring its surfaces, either through oxidation, de-carbonizing or through electrical faults brought about by the excess presence of moisture.

Referring then to the drawings, 10 is the gun, 11 is the main frame of the apparatus both vertical, and founded upon the floor 12 of the shop, or other platform upon which the equipment is to be used. The gun points vertically upward and at its end which is at the floor 12 is seated and centered upon a flanged centering ring 13 borne upon the head of a base block 14 appropriately anchored as by bolts 15 to the foundation of the floor. It is retained in place against axial displacement not only by the flange 16 of the plate 13, but also by an encircling clamping block 17 which is made in two halves hinged together at 18 and clamped together and about the gun through the swinging link pin 19 engaging its opposite side in a well known manner.

The standards 11 of the main frame of the machine are anchored to the concrete floor or other platform 12 in any suitable manner and projecting vertically upward. They support the upper end of the gun 10 by means of a laterally projecting arm 20, which arm is vertically adjustable up and down the reduced cross section 21 of the standard 11 and clamped in any adjusted position by means of the bolts 22 which connect together the halves which embrace the shaft 21. The end which engages the muzzle of the gun 10 is also made in two halves, as indicated at 23, the one of which is integral with the arm 20 and the other swingable about the pivot 24 to engage and center the upper end of the gun through the V-shaped jaws 25 and thereafter be clamped firmly thereupon by the link pin 26 connecting together the opposite ends of the halves from the pivot 24. Between the floor level 12 and this arm 20 supporting, aligning, centering and clamping the upper end of the gun is located a transverse inter-column brace member 27 for the three columns 10. Such a brace is located also at the extreme upper end, it will be seen, and as many of these inter-column braces may be utilized at different points as it may prove expedient to use. Each of these comprises a generally triangular main body, one apex of which, 28, is made in halves and fixedly clamped about the central column 11 and the two other apices of which are made in halves bridged by a common hinged bridging member 29 pivoted by a hinge 30 to the main body 27 and coupled to the main body at the end opposite the hinge 30 by means of the link pin coupler 31. These members 27 engage shoulders 32 respectively upon the columns. They do not engage the barrel of the gun. Instead, the main body is provided with an opening 33 concentric with the axis of the gun and large enough for the barrel to pass freely therethrough. If desired, however, adapters may be placed in this opening of sufficient size to engage the barrel and be clamped about it by the bridging member 29 when the members 27 are arranged in place. The opening of the bracing members 27 through the swinging of the bridging member 29 enables the guns to be placed in the apparatus and removed therefrom without dis-assembly of the apparatus and to be placed in position laterally rather than raised or lowered vertically into position.

On the upper portion of the main frame column 11 are mounted upper and lower swingable bracket arms 34 and 35, at opposite ends of a spacing sleeve 36, the upper bracket arm 34 being mounted upon the reduced upper portion of the main frame column 11 and arranged to be clamped in position thereon against shoulder 37 by means of a clamping nut 38, while the lower bracket arm 35 is split where it surrounds the column and arranged to be clamped thereon by means of suitable clamp bolts 39. The swinging bracket arms 34 and 35 form a support for the tool carriage 40 which it supports on a rotatable feed screw shaft 41 journaled at opposite ends in the upper and lower bracket arms 34 and 35 by means of suitable ball bearing journals 42 and 43 respectively, the screw shaft 41 being arranged to be rotated by means of a bevel gear 44 secured at its upper end by means of a suitable key 45 and driven by a complementary bevel gear 46 carried at the end of the shaft of the motor 47 mounted upon the top of the upper bracket arm 34.

The screw shaft 41 is in driving engagement with the tool carriage 40 through the internal threaded portion 48 of the carriage through which it passes for elevating and lowering the carriage according to the direction of rotation of the screw shaft. The bracket 49 mounted on the carriage 40 carries the heating coil supporting rod 66 and a motor cylinder 50 which movably supports the casing 51 of a switching transformer.

The transformer casing 51 is supported for definite limited movement by the work cylinder 50 relative to the rod 66 by means of the tubular piston rod 52 carried by the piston 53 fitted in the work cylinder about the rod 66. The transformer casing comprising upper and lower portions 54—55 is provided in its lower portion with a cylindrical transformer primary element 56 comprising a cylindrical laminated core element 57 carrying nested within its inner cylindrical surface the primary transformer winding 58 whose terminals 59—60 extend outwardly through the transformer casing for connection with a suitable source of alternating current, not shown. Mounted within the transformer casing 51 is the secondary transformer element 62 comprised in general of the secondary transformer winding 63 imbedded in the outer surface portion of a hollow laminated core element 64, the whole assembled between end plates 65 and carried upon the hollow vertical slide rod 66 in fixed relation therewith so that when the piston 53 of the work cylinder 50 is moved to its lowermost position in the cylinder, the secondary transformer element 62 will remain stationary while the transformer casing 51 will move downwardly relative thereto. This relative movement will bring the primary transformer element 56 and with it the primary winding 58 down over the laminated core extension 61, the latter providing a low reluctance core element for the primary winding.

The hollow rod 66 is held fixed in relation to the cylinder 50 and bracket 49 at its upper end by means of the shouldered portion 67 and the nut 68, the transformer casing 51 having sliding bearing on the rod 66 through the tubular piston rod 52.

The hollow rod 66 has sliding bearing in the bushing 69 in the bracket 35 through which bushing it extends down into and through the barrel of the gun 10 to the breech end where it carries the inductive heating coil 70 which in its present lowermost position is situated outside the breech within a lower terminal chamber 71 in the base block 14.

Circuit connection between the winding 63 of the transformer secondary element and the heating coil 70 is effected by means of the secondary terminals 72 and tubular conductors 73 which extend down through the hollow tube 66 to the terminals of the heating coil 70. Cooling water is circulated through the tubular conductors 73 for supply of cooling liquid to the transformer secondary coil and the heating coil 70 by means of the upper extensions of the tubes 73 which extend up through the hollow tube above the bracket 49 as indicated at 74 where they may be connected with any suitable source of supply of cooling fluid not shown.

The chamber 71 is formed with an internal diameter the same as that of the bore of the gun and is lined with a radially laminated wall 75 extending up to form a laminated lining or protecting sleeve 76 for the threaded portion of the gun breech. The function of this laminated lining is to provide a low impedance magnetic circuit for the heating coil 70 for a purpose to be hereinafter explained in connection with the description of operation.

Like the secondary transformer element 62 the heating coil 70 is formed of a hollow conductor carried upon a cylindrical radially laminated core element 77, but with an outside diameter proportioned to pass freely through the barrel of the gun out of contact therewith and in close proximity to the surface of the bore.

At the muzzle of the gun 10 I provide an upper terminal chamber 78 similar to the lower terminal chamber 75 and like the chamber 75 provided with a radially laminated lining or wall 79, so positioned and proportioned as to receive and surround the heating coil 70 when the latter is drawn up thereinto, to provide a low reluctance magnetic circuit for the coil. The chamber 78 is hermetically sealed to the muzzle of the gun 10 by means of the gasket element 80 fitted between the lower opening of the chamber and the muzzle of the gun, and a stuffing box 81 at the top of the chamber for the hollow rod 66. Pressure control valve 82 connected with the upper end of the terminal chamber 78 provides for the introduction of a dry inert gas under pressure from a suitable source not shown, whereby the chamber 78 and the gun barrel 10 may be maintained filled with an inert gas under pressure, the gas passing on down through the clearance between the heating coil 70 and the bore of the gun into the lower terminal chamber 71 to an outlet conduit 83 which latter provides an outlet permitting complete displacement of air or other undesirable substance from the gun bore by the inert gas.

A lower extension 84 of the bottom terminal chamber 71 extends down through the supporting floor 12 into communication with a quenching fluid exhaust chamber 85. Through this chamber a sliding quench-tube 86 passes up into the lower extension 84 of the lower terminal where the tube carries a quenching head 87 spaced from and substantially sealed off from the heating coil 70 by means of a piston head 88 and center projection 89 fitting into the open end of the hollow core of the heating coil 70. The tubular rod 86 enters the exhaust chamber 85 through suitable stuffing box 90 and is mounted for vertical movement to progress the quenching head 87 up through the lower terminal chamber 71 into and through the bore of the gun to the upper or muzzle end of the gun, and to thereafter retract the quenching head back to its lowermost position shown in Fig. 9 of the drawings.

Movement of the quenching head is properly coordinated with the movement of the heating coil 70 to follow the upward movement of the heating coil through the gun barrel in constant spaced relation to the coil as determined by spacing piston or closure element 88. In the present embodiment this coordinated movement of the quenching head is effected by means of a driving motor 91 operating through a pinion 92 and vertically sliding rack element 93 carrying bracket 94 to which the lower end of the tube 86 is fixed. The driving motor is adapted to exert sufficient lift on the tube 86 to cause it to follow the heating head upwardly through the gun barrel and without undue upward pressure on the heating coil. A stationary brace and guide element for the rack 93 extends vertically between the floor support 12 and a lower stationary bracket support 96. The quenching fluid is supplied to the tubular rod 86 by means of a flexible hose connection 97 at the lower end of the tube. Exhaust quenching fluid is drawn off from the exhaust chamber 85 through the outlet conduit 98 and pressure valve 99 and a trap or gas and liquid separator 100 for separating such of the inert gas as may pass downwardly into the exhaust chamber 85.

Operation of the pneumatic motor cylinder 50 is controlled through an electro-magnetically operated control valve 101 and piston valve 102 operable in known manner upon energization to exhaust the top of the cylinder 50 and admit air to the bottom thereof to raise the piston 52 to the top of the cylinder and upon deenergization to exhaust the lower end of the cylinder and admit air to the upper end to effect downward movement of the piston thus operating upon energization to raise the transformer shell 51 into the position shown and upon deenergization to effect lowering of the transformer shell to move the primary winding 63 out of cooperative relation with the secondary winding 64 and into cooperative relation with the low reluctance magnetic circuit element 61.

Figure 13:
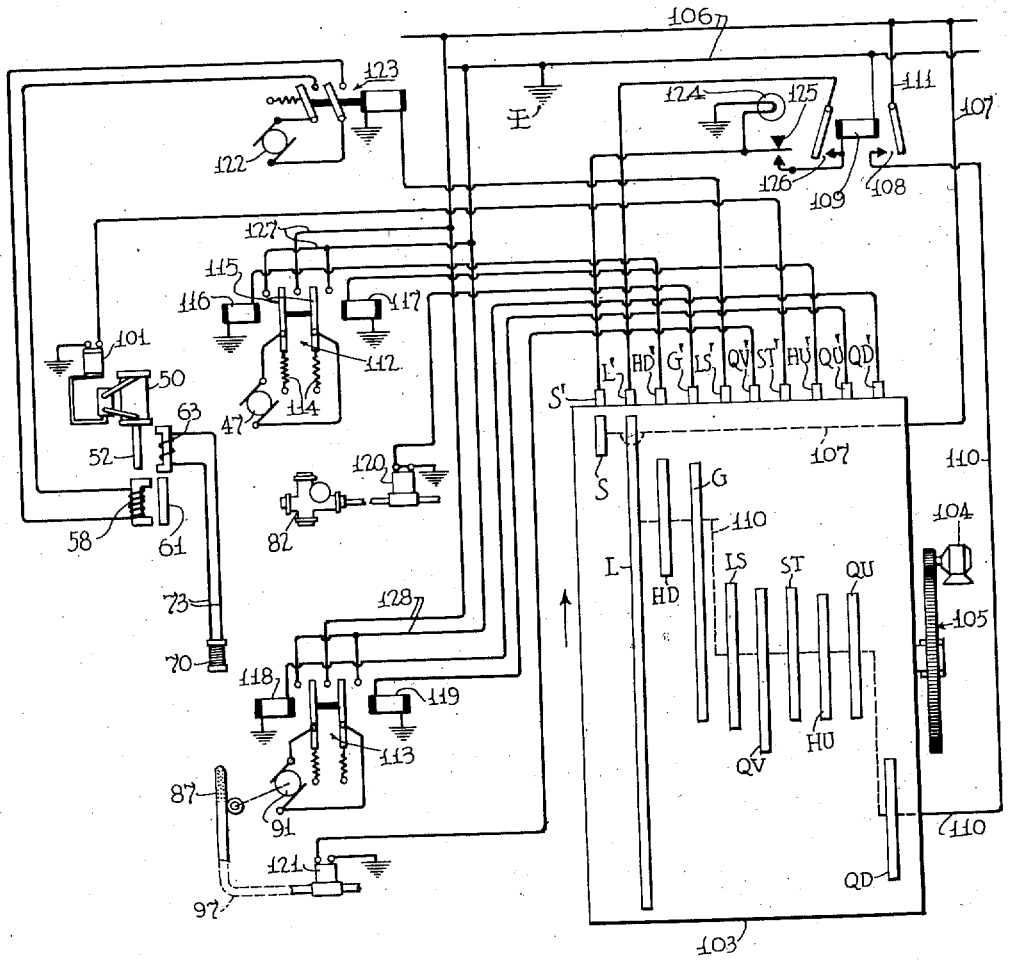
Fig. 13 is a circuit diagram of the control system.

To insure operation of the various parts in proper sequence for carrying out a complete operation on a gun barrel, I provide the control system and chronologically driven controller therefor diagrammatically shown in Fig. 13 of the drawings. In this diagram, the controller which is preferably in the form of the usual commutator drum element 103 of insulating material is here shown opened out into a plane surface development of its cylindrical surface, the top and bottom edges of which represent the same generating line of the cylindrical surface. The drum of insulating material has formed thereon or in-set therein various commutator sectors such as S, L, etc. for effecting electrical contact with stationary contact brush elements S', L', etc. respectively during rotation of the drum and in proper sequence. To effect proper timing of the sequence of circuit closure by the controller, the drum 103 is arranged to be rotated at a predetermined rate by means of a suitable driving motor 104, preferably a synchronous motor and through suitable reduction gears 105. Current for the control system may be derived from any suitable source of current supply here indicated as an ordinary commercial line 106, which for the sake of simplicity in circuit connections is shown as having the lower side earthed or grounded as indicated by a ground symbol E and the upper side free or ungrounded, such connections as lead from the apparatus to the grounded side of the line being indicated by a similar ground connection symbol. As indicated in the circuit diagram, the control commutator drum 103 is provided with a starting signal control segment S permanently connected to the free side of the line through conductor 107 while all of the other segments L, HD, G, etc. are connected to the free side of the line through normally open contact 108 of a locking relay 109 by way of conductors 110 and 111. Thus, the segment S will always effect a connection from the free side of the line to its associated brush S' while all of the other segments L, HD, G, etc. are operative to effect connection of the free side of the line to their associated brushes L', HD', G', etc. only during closure of the contact 108 of locking relay 109.

For control of the traversing motors 47 and 91 for raising and lowering the heating coil 70 and quenching nozzle 87, respectively, the motors 47 and 91 are provided with pole-changer switches 112, 113 respectively suitably arranged for effecting the proper change of polarity for reversing their respective motors in any suitable manner according to the type of motor. As the two motor circuit diagrams are alike, it will be necessary to describe but one of them, for example, that of the heating coil traversing motor 47 which it will be noted comprises the pole-changer switch 112 heretofore mentioned arranged to be normally held in an open circuit position as by the centering retractile springs 114 connected to the pivoted arms 115 of the switch below the pivotal points, the pivoted arms of the switch being arranged to be moved to one side or the other by solenoids or magnets 116, 117, respectively, to energize the motor for rotation in one or the other direction for bringing about a downward or upward movement of the heating coil 70. Similarly, the pole-changer switch 113 is moved to the right or left by magnets 118 and 119, respectively, for movement of the quenching head 87 downwardly and upwardly. The control of pressure fluid to the motor cylinder 50 is effected by an electro-magnetic valve 101, control of the inert gas supply to the pressure control valve 82 is effected through an electro-magnetic valve 120 and control of the quenching fluid from a suitable source of supply to the flexible hose connection 47 leading to the quench-head 87 is effected by an electro-magnetic valve 121. One terminal of each of the operating magnets 116, etc. and the electro-magnetic valves 101, etc., is connected to the grounded side of the line 106 as diagrammatically shown while the ungrounded terminals of each of such operating magnets and electro-magnetic valves are arranged to be connected to the free side of the line 106 at predetermined intervals through their respective control brushes and commutator segments on the controller 103. The controller also governs the connection of the primary winding 56 of the switching transformer to a source 122 of high frequency current through an electro-magnetically operated line switch 123 whose operating magnet like the various other operating magnets has one terminal normally grounded and the other terminal arranged to be connected with the free side of the line 106 through a brush and commutator segment of the controller. A starting segment 124 and starting push button 125 complete the control equipment.

In operation, assuming that a gun to be operated upon is in position in the machine as shown in the several drawings, the upper terminal chamber 78 in place on the muzzle of the gun 10 in sealed relation thereto, the heating coil element 70 in the raised position and wholly within the upper terminal chamber, the quench-head 87 in the lowermost position as shown in the several views, and the various circuits and apparatus elements of the control system in the position indicated in the diagram Fig. 12 with the controller drum 103 rotating to move the various commutators S, L, etc., in the direction indicated by arrow adjacent to the drum, continued rotation of the drum from the position shown first brings the commutator segment S, normally connected to the free side of the line through conductor 107, into contact with its associated brush S' thus connecting the free side of the line to the ungrounded terminal of the starting signal lamp 124 which lights the lamp indicating to the operator that the controller is ready to start its cycle of operations. The operator may then start the cycle of operations by pressing the starting button 125 which completes the energizing circuit of the locking relay 109 over a path which may be traced from the grounded side of line 106 through locking relay 109, push button 125, controller brush S', segment S, conductor 107 to the free side of line 106. Locking relay 109 upon energization attracts its armatures connecting the free side of line 106 through conductor 111 and normally open contact 108 (now closed) to conductor 110 through which the connection from the free side of line is extended to all of the controller segments L, HD, etc., excepting the starting segment S as indicated by the dotted line extension of conductor 110 through the controller drum. The locking controller segment L having made contact with its associated brush L' at or immediately after connection of the starting segment S with its associated brush, the energization of the locking relay 109 completes its locking circuit through this locking segment over a path which may be traced from the grounded side of line 106 through relay 109, locking contact 126, circuit controller segment L, conductor 110 to free side of line as previously traced through contact 108 of the locking relay. The locking relay 109 thus remains energized maintaining all of the controller segments connected to the free side of line during the passage of the long locking segment L under its associated brush L'.

Figure 9:
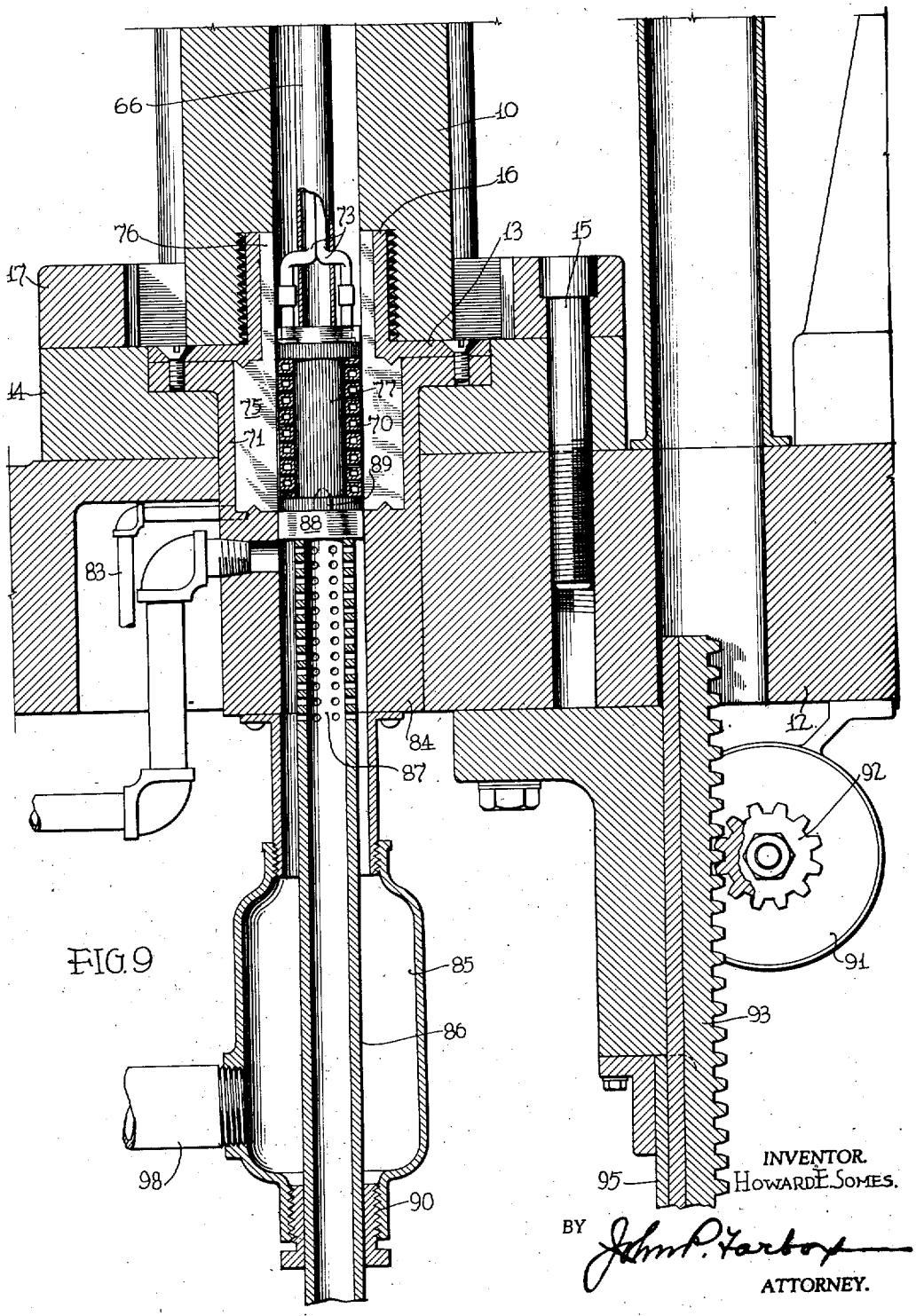
Fig. 9 is a fragmentary enlarged view of the lower end of the machine lying within the dotted rectangle 9 of Fig. 1, portions of the same being shown in vertical section.

The controller segment HD now engaging its associated brush HD' completes a circuit from the free side of line through brush HD, to the operating magnet 116 which, becoming energized, moves the pivoted blades of the pole-changer switch 112 to the left completing the circuit of motor 47 to the line 106 through branch conductors 127 to cause operation of the motor 47 in a direction to move the heating coil 70 downwardly from the upper terminal chamber 78 through the bore of the gun and into the lower terminal chamber 71 as indicated in Fig. 9 of the drawings. Immediately after the heating coil 70 starts its downward movement the controller segment G starts engagement with its associated brush G' through which it effects connection of the free side of line 106 to electro-magnetic valve 120 to energize the same and connect the pressure control valve 82 to a suitable source of supply of dry inert gas. The dry inert gas thus enters the upper terminal chamber 78 as the heating coil leaves the chamber, following the coil down and continuing to fill and maintain the bore of the gun filled under suitable pressure during the downward movement of the heating coil and continuing after the heating coil reaches its lowermost position, the gas escaping through the clearance between the heating coil and the sides of the lower terminal chamber and out through the vent conduit 83. The length of the heating coil control segment HD is so proportioned in relation to the speed of the controller and the rate of downward movement of the heating coil 70 as to pass beyond the brush HD' immediately after the heating coil reaches the bottom of the lower terminal chamber 71. Any known or other suitable means may be provided for causing the heating coil to come to rest in the lower position shown in Fig. 9 of the drawings without undue strain on the mechanism, as by providing the motor 47 in the form of a constant torque motor or by providing a suitable slip clutch connection between the motor and the driving screw 41 or by the provision of suitable resilient or elastic lost-motion means. After the segment HD has passed beyond its complementary brush HD' and the heating head 70 has come to rest at the lower position shown in Fig. 9, the line switch segment LS engages its associated brush LS' to connect the free side of line 106 with the operating magnet of the electromagnetic line switch 123 which thereupon connects the primary winding 56 of the switching transformer with the source of high frequency current 122. However, the heating coil 70 is not energized at this point because of the fact that, as shown in the diagram in Fig. 13, the primary winding 58 is uncoupled from the secondary winding 63. Soon after this point in the cycle the commutator segments QV and ST for controlling the supply of quenching fluid and for actuating the switching transformers, respectively, pass into engagement with their respective associated brushes QV' and ST'. The commutator segment QV effects connection of the free side of line 106 through commutator segment QV' to the electromagnetic control valve 121 which, becoming energized, connects the quench-head 87 through flexible hose connection 97 to a suitable source of supply of quenching fluid under pressure. The commutator segment ST connects the free side of line 106 through its complementary brush ST' to the electromagnetic valve 101 which energizing admits air to the lower end of motor cylinder 50 raising the transformer shell and with it the primary transformer winding 56 of the switching transformer into a transformer coupling relation with the secondary winding 62. The heating coil 70 is now energized from the secondary winding 62 over the hollow conductors 73. With the heating coil thus energized and the quenching head operating to spray qunenching fluid outwardly in the space surrounding the quenching head below the heating coil, the commutator segments HU and QU move into contact with their respective brush elements HU' and QU' to connect the free side of line 106 with the operating magnets 117 and 119 of the pole-changer switches 112 and 113 to connect the motor 47 and 91 through the branch circuits 127 and 128 respectively to the line circuit 106 in a manner to cause the motors to rotate in a direction to move both the heating coil 70 and the quenching head 87 upwardly through the barrel of the gun, the quenching head 87 following the heating coil upwardly through the barrel until the heating coil enters and comes to rest in the upper terminal chamber 78, at which time the segments HU and QU pass from under their respective brushes to deenergize the control magnets 117 and 119 which in turn permit restoration of the pole-changer switches to the intermediate or open circuit position thus effecting deenergization of their respective motors 47 and 91. The operation of the motors 47 and 91 is so timed that the heating coil will move upwardly through the bore of the gun, at the constant rate required to effect the proper heating followed by the quenching head 87, the quenching head following always in abutment against the lower end of the heating coil 70 through the spacing piston diaphragm 88 to insure constant spaced relation between the zone heated and the point of application of quenching fluid. The parts may be coordinated in any suitable manner to insure this following of the coil by the quench-head as by accurate timing of the motors or, preferably, by having the motor 91, of a constant torque type, designed to overcome the weight of the spray head and its movable parts with sufficient margin of power to urge the quenching head upwardly always in contact with the bottom of the heating coil 70.

After the heating coil enters the uppermost terminal chamber 78, the commutator segments HU and QU moving out of contact with their respective brushes HU' and QU' open the circuit of the magnets 117 and 119 to deenergize the motors 47 and 91. Movement of the heating coil all the way up into the upper terminel chamber followed all the way by the quenching head both stopping in their extreme upper positions without undue strain on the machinery may be assured in any known or other suitable manner as suggested in connection with the stopping of the heating coil in its lowermost position within the lower terminal chamber 71. Upon entrance of the heating coil into the upper terminal chamber, the segment G of the controller passes out from under its associated brush G' breaking connection between the free side of line 106 and the brush G'. This deenergizes electromagnetic valve 120 cutting off the supply of gas to the regulating valve 82. Substantially at the same time, the switching transformer control segment ST passes out of contact with its associated brush ST' disconnecting the free side of line 106 from this brush thus deenergizing electromagnetic valve 101 which operates to exhaust pressure fluid from the bottom of the motor cylinder 50 and admit pressure fluid to the top thereof to move the casing of the switching transformer downwardly and with it the primary winding 58 restoring the switching transformer to its uncoupled position. Movement of the switching transformer to uncoupled position brings the primary winding 56 into inductive relation with the low reluctance magnetic circuit furnished by the laminated core extension 61 to prevent unfavorable change in the reactance of the circuit of the switching transformer.

After uncoupling of the switching transformer 56, the control segment LS moves out of contact with its associated brush LS' disconnecting the free side of line 106 from the latter and thereby deenergizing the electromagnetic line switch 123 and disconnecting the primary coil 56 from the source 122 of high frequency current. The commutator segment QV now passing out of contact with brush QV' opens the circuit of the electromagnetic control valve 121 which deenergizing cuts off the supply of quenching fluid from the quenching head 87. Control segment QD now moves into contact with its associated brush element QD' connecting the free side of line 106 to said brush and thereby completing the energizing circuit of operating magnet 118 of pole-changer switch 113 which magnet upon energization moves the switch 113 to the left to connect the motor 91 through extension conductors 128 to the line 106 for reverse movement to effect downward movement of the spray head 87 to the lowermost position as indicated in Fig. 9 of the drawings. When the spray head 87 reaches such lowermost position, the segment QD moves out of contact with the brush QD', opening the circuit of magnet 118 which permits the pole-changer switch 113 to move into open circuit position, deenergizing motor 91. The length of the segment QD is so proportioned in relation to the speed of the motor 91 and the speed of the controller 103 as to effect this deenergization of the motor when the quenching head 87 reaches its lowermost position. Any known or other suitable means, not shown, may be provided to enable the quenching head 87 to come to rest in the position shown in Fig. 9 of the drawings without undue shock to the mechanism and without imposing undue load on the motor 91, such for example as the use of a slipping clutch connection or resilient lost-motion connection between the quench-head tube 86 and the driving motor or by suitable selection of the electrical characteristics of the motor. After the segment QD passes from under its brush QD', the locking circuit segment L passes from under its associated brush L' opening the locking circuit of relay 109 previously maintained through this segment and the locking contact 126. The initial energizing circuit of relay 109 being open at the push button 125, the relay becomes deenergized opening the connection between conductor 110 and the free side of line 106 at contact 108 thus removing the line connections from all of the commutator segments except the starting-signal segment S.

The controller thus restored to normal with the various apparatus and circuit elements in the position as shown in Fig. 12 leaves the apparatus in a position with the heating coil 70 in the upper pressure chamber 78 clear of the muzzle of the gun, and the quenching head 87 in the lowermost position as shown in Fig. 9 of the drawings outside and clear of the breech of the gun. The gun thus heat-treated is now free to be removed from the machine after release from the various clamping and holding elements such as the arms 20 and 27 and the centering clamp 17.

A gun so treated is shown in Fig. 12 of the drawings where the heat-treated portion near and including the inner surface of the bore is indicated at 129

Figure 1:
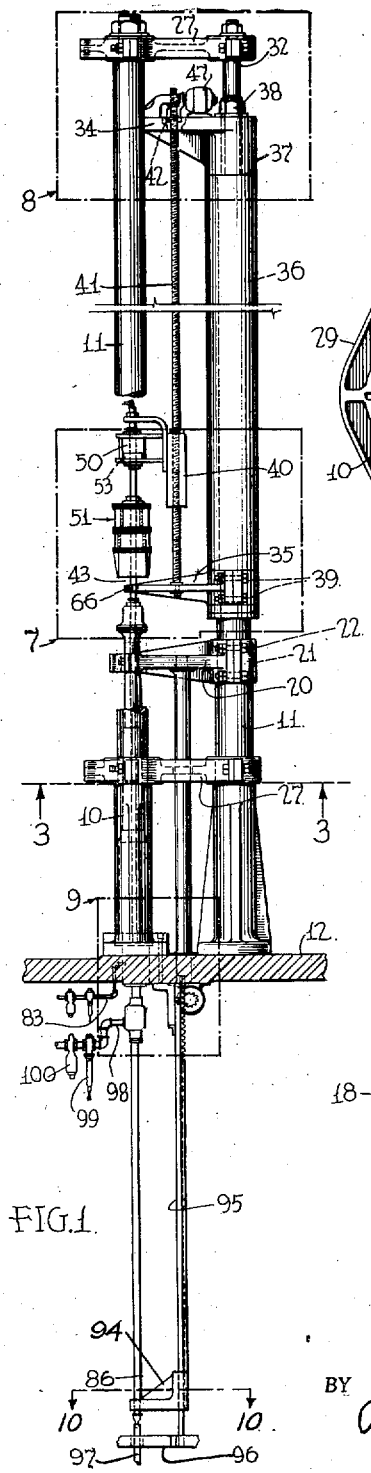
Fig. 1 is a vertical side elevation of the apparatus.
Figure 3:
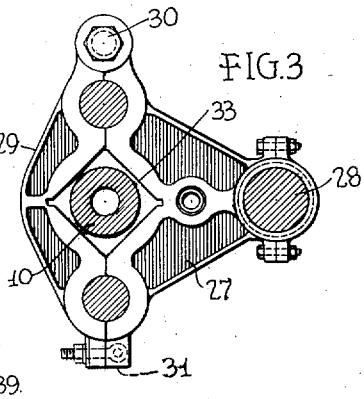
Fig. 3 is a transverse cross section of the vertical framework of the apparatus.
Figure 5:
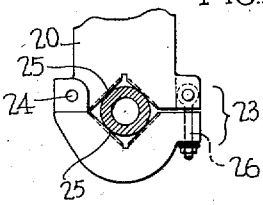
Fig. 5 is a plan view of the end of the supporting arm.
Figure 6:
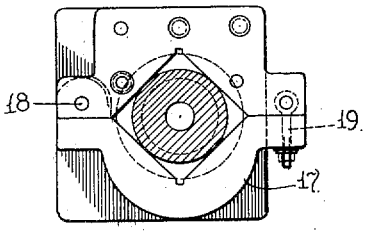
Fig. 6 is a plan view at the top of the base block supporting the work.
Figure 8:
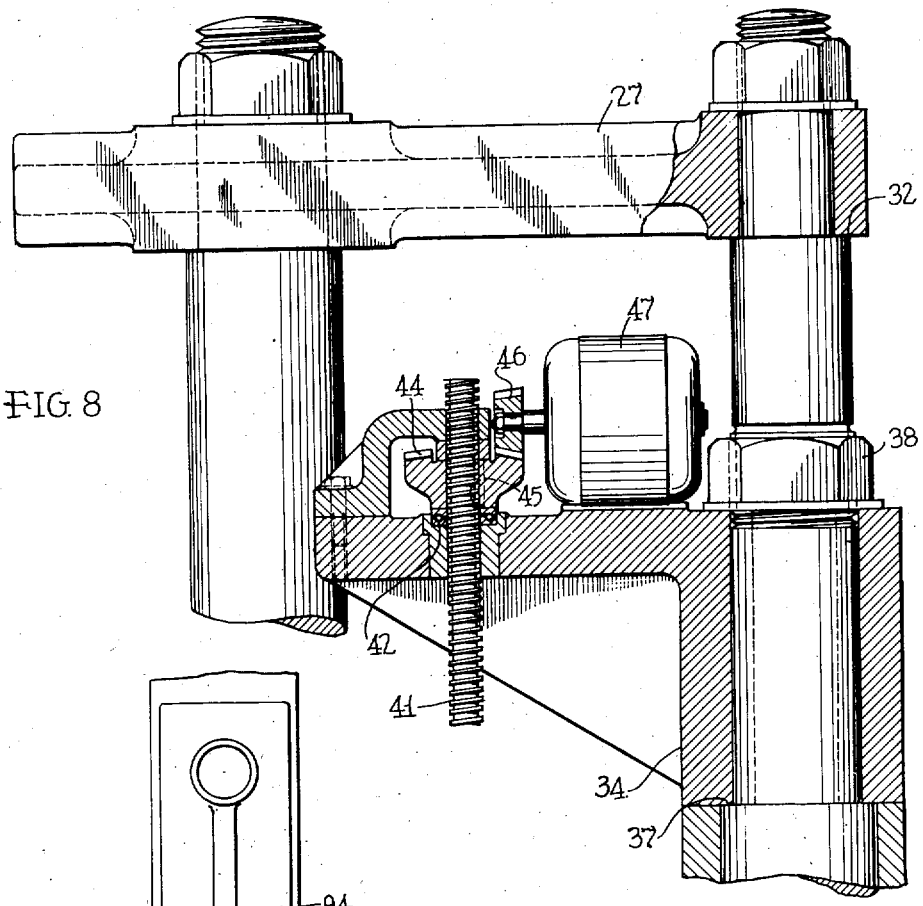
Fig. 8 is a fragmentary enlarged view of the upper end of the machine lying within the dotted rectangle 8 of Fig. 1, portions of the same being shown in vertical section.
Figure 10:
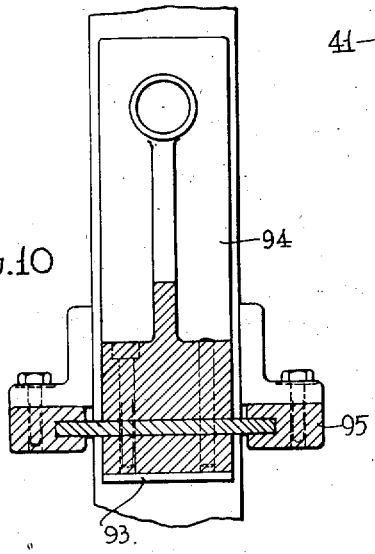
Fig. 10 is a transverse section of the quenching mechanism feed on line 5—5 of Fig. 1.
Figure 11:
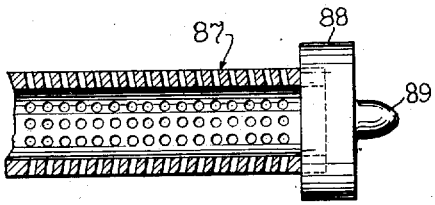
Fig. 11 is a detail of the quenching spray head.

During upward movement of the heating coil 70 closely followed by the quenching head 87, quenching fluid is kept out of contact with the coil or the clearance space between the coil and the bore of the gun by means of the separating piston member 88, leakage of quenching fluid beyond the piston through the slight clearance between the piston and the walls of the gun bore being prevented by the presence of the inert gas under pressure in the spaces above the quenching head and by the downward passage of such gas through the clearance between the separating piston 88 and the walls of the gun bore. Any gas passing out through the quenching fluid outlet conduit 48 (where a liquid quenching fluid is used), may be separated off from the liquid by the liquid trap 101 (Fig. 1).

Inasmuch as the heating coil 70 is initially energized for its upward movement through the barrel of the gun before entering the breech of the gun and is maintained energized after leaving the muzzle to insure an even treatment of the gun barrel throughout its length, it is desirable to maintain the electrical characteristics of the heating coil substantially constant during such movement and during its complete time of energization. This is to insure that the energy output of the coil will remain substantially constant throughout its passage through the gun barrel and during its energization while outside of the gun barrel in either the upper or lower terminal chambers, and it is for this purpose that the low reluctance laminated inner wall or linings 79 and 75 are provided for the upper and lower terminal chambers 78 and 71, respectively. Preferably such low reluctance elements are arranged to maintain the inductive reaction of the heating coil 70 substantially constant throughout its travel from the lower terminal chamber to the upper terminal chamber, or otherwise affect such reactance to prevent undesirable change in power factor due to removal of the coil from the surrounding low reluctance material of the gun.

While I have herein shown and described a preferred embodiment of my invention for the sake of disclosure, it is to be understood that the invention is not limited to the specific embodiment shown and described, but contemplates all such variants and modifications thereof as fall fairly within the scope of the appended claims.

What I claim is:

1. An apparatus of the type described comprising means for holding an object having a cylindrical bore, an induction heating element arranged to be moved into and out of the bore of the object held by said holding means, a quenching nozzle arranged to follow said heating element into the bore near the trailing end of the heating element, and means for maintaining an inert gas in the bore on the side of the heating element remote from the quenching nozzle and in the clearance between the heating element and the bore.

2. An apparatus of the type described comprising means for holding an object having a cylindrical bore, an induction heating element arranged to be moved into and out of the bore of the object held by said holding means, a quenching nozzle arranged to follow said heating element into the bore near the trailing end of the heating element, and means for maintaining a flow of gaseous fluid adjacent the bore in the clearance between said heating element and said nozzle in a direction from the heating element toward the nozzle.

3. Apparatus for heat-treating elongated hollow cylindrical objects of magnetic material at and near the inner surface comprising an electromagnetic induction heating element less in length than the length of the inner surface to be treated and provided with an internal core only, and arranged to have its magnetic circuit completed substantially wholly by the material of said object, means for moving the heating element from a point outside the object into and through the hollow of the object to a point outside the object, and low reluctance means arranged at each end of the object to form a substantially continuous extension of the object and to contain the entire portion of the heating element not contained in the workpiece object during the entire entrance and withdrawal movement of the heating element.

4. Apparatus for heat-treating elongated hollow cylindrical objects of magnetic material at and near the inner surface comprising an electromagnetic induction heating element less in length than the length of the inner surface to be treated and provided with an internal core only and arranged to have its magnetic circuit completed substantially wholly by the material of the said object, means for moving the heating element from a point outside the object into and through the hollow of the object to a point outside the object, and low reluctance means arranged at each end of the object for maintaining the inductive reactance of said heating element during the entire entrance and withdrawal movement of the latter into and from the hollow object at least substantially equal to the inductive reactance of said heating element during its presence in the hollow object.

5. Apparatus for heat-treating elongated hollow cylindrical objects of magnetic material at and near the inner surface, comprising an induction heating element arranged to be moved through the bore of the object and provided with an internal core only and arranged to have its magnetic circuit completed substantially wholly by the material of said object, and means situated at each end of the object providing a magnetic circuit conductor for the heating element adjusted to compensate for removal of the heating element partly or wholly out of the object to maintain substantially the full inductive load of the heating element.

6. Apparatus for heat-treating elongated hollow cylindrical objects of magnetic material at and near the inner surface, comprising means for holding the object to be treated, an electromagnetic induction heating element adapted to be passed through the hollow of the object, a receptacle at each end of the object arranged to receive the heating element during its passage into and out of opposite ends of the object, means for guiding the heating element through the object from one of said receptacles to the other, means for moving said heating element in said guided path, said receptacles being formed in part of magnetic material and sealed in communication with the interior of the object to provide with the interior of the object a substantially gas tight enclosure, switching means controlling the flow of current to said heating element, gas control means controlling the supply of gas to the interior of said object and said receptacles, and control means for controlling the operation of said heating element moving means, said gas control means and said switching means in predetermined timed order.

7. Apparatus for heat treating a hollow cylindrical object having axially contiguous inner cylindrical surfaces, comprising an electromagnetic induction heating element arranged to be placed within the object adjacent said contiguous surfaces, and an annular element of laminated, low reluctance material arranged to be placed within the object in telescoping relation between one of said surfaces and an axial portion only of said heating element for shielding the one of said surfaces from the inductive heating of said heating element and for providing in series with the other axially contiguous cylindrical surface of the object a magnetic circuit for said heating element.

8. Apparatus for heat treating the bore of an elongated hollow cylindrical object having an axial end portion of its bore enlarged in diameter, comprising an induction heating element less in length than the length of the bore to be treated, means for moving said heating element axially within the bore of the object for generating heat in different portions thereof, and a laminated low reluctance element of annular cross-section arranged to form a substantially continuous axial extension of the one end of the object, and extending into the axial portion of enlarged diameter to lessen the heating effect of the heating coil upon said axial portion.

9. Apparatus for heat treating an object having a cylindrical bore, comprising an induction heating element arranged to be moved through the bore of the object, a closure cover for one end of the bore, a bore closure piston element arranged to follow the heater element in its movement through the bore toward the closure cover, and means for maintaining an inert gas within the bore between said cover and the heating element and surrounding the heating element.

10. Apparatus for heat-treating elongated hollow cylindrical objects of magnetic material at and near the inner surface, comprising means for holding the object to be treated, an electromagnetic induction heating element adapted to be passed through the hollow of the object, a receptacle at one end of the object arranged to receive the heating element during its passage into and out of the object, means for guiding the heating element through the object from one end to the other, means for moving said heating element in said guide path, said receptacle being formed in part of magnetic material and substantially sealed in communication with the interior of the object to provide with the interior of the object, a gas retaining enclosure, switching means controlling the flow of current to said heating element, and gas control means controlling the supply of gas to the interior of said object and said receptacle.

11. Apparatus for heat treating, at and near the inner surface, elongated hollow cylindrical objects of magnetic material having a continuous circular cross section, comprising an electromagnetic induction heating element less in length than the length of the object to be treated, and provided with a core arranged to lie internally of the object and to have its magnetic circuit completed substantially wholly by the material of said objects, means for moving the heating element through the hollow of the object to a point outside the object, and means composed of magnetic material arranged at one end of the object to form a substantially continuous extension of the object of continuous annular cross section, into which the entire heating element may pass during the withdrawal movement of the latter.

12. Apparatus for heat treating elongated hollow cylindrical objects of magnetic material at and near the inner surface, comprising an electromagnetic induction heating element less in length than the length of the object to be treated, and provided with a core arranged to lie internally of the object and to have its magnetic circuit completed substantially wholly by the material of said object, means for moving the heating element through the hollow of the object to a point outside the object, and means composed of magnetic material arranged at one end of the object to form with the object and the aforesaid core substantially the entire magnetic circuit of the induction heating element.

13. Apparatus for heat treating hollow cylindrical metallic objects at and near the inner surface, comprising an electromagnetic induction heating element, means for moving the heating element through the hollow of the object to one end of the object, and means composed of material similar to the material of the object, of continuous annular cross section, and arranged to form a substantially continuous axial extension of the object.

14. Apparatus for heat treating hollow cylindrical objects of magnetic material at and near the inner surface comprising an electromagnetic induction heating element less in length than the length of the object to be treated, and provided with a core arranged to lie internally of the object and to have its magnetic circuit completed substantially wholly by the material of said object, means for moving the heating element through and outside of the object, and means composed of magnetic material of continuous annular cross section arranged to form a substantially continuous axial extension of the object.

15. Apparatus for heat treating a surface portion of an elongated object, comprising an electromagnetic induction heating element, means for moving the heating element along the object in the direction of elongation of the object and beyond one end of the object and means composed of magnetic material arranged to form a longitudinal extension of the object from the end beyond which the heating element is moved and having a transverse cross section of substantially the same shape as that of the said end portion of the object whereby uniform heat treatment may be effected along the object and at the end thereof.

16. Apparatus for heat treating a surface portion of an elongated object, comprising an electromagnetic induction heating element, means for quenching, means for moving the heating element and the quenching means along the object in the direction of elongation of the object in fixed spaced relation and beyond one end of the object and means composed of magnetic material arranged to form a longitudinal extension of the object from the end beyond which the heating element is moved and having a transverse cross section of substantially the same shape as that of the said end portion of the object whereby uniform heat treatment may be effected along the object and at the end thereof.

17. Apparatus for heat treating a surface portion of an elongated object, comprising an electromagnetic induction heating element, means for quenching, means for moving the heating element along the object in the direction of elongation of the object and beyond one end of the object and means for moving the quenching element with said heating element in fixed spaced relation, and means composed of magnetic material arranged to form a longitudinal extension of the object from the end beyond which the heating element is moved and having a transverse cross section of substantially the same shape as that of the said end portion of the object whereby uniform heat treatment may be effected along the object and at the end thereof.

18. Apparatus for heat treating elongated objects of magnetic material at and near the surface by inducing surface currents therein flowing transverse to the longitudinal axis of the object, comprising an electromagnetic induction heating element adapted to induce said surface currents for a distance along the object less than the length thereof, means for moving the heating element along the length of the object between an intermediate point between the ends of the object and a point beyond one end of the object, a magnetic means of low reluctance material having a transverse cross section of substantially the same shape as that of the object arranged at the end of the object and adapted to form a longitudinal extension of the object, whereby substantially uniform heat treatment from the said intermediate point to the end point of the object may be effected.

19. Apparatus for heat treating elongated objects of magnetic material at and near the surface by inducing surface currents therein flowing transverse to the longitudinal axis of the object, comprising an electromagnetic induction heating element adapted to induce said surface currents for a distance along the object less than the length thereof, means for quenching and means for moving the heating element and the quenching means along the length of the object in fixed spaced relation between an intermediate point between the ends of the object and a point beyond one end of the object, a magnetic means of low reluctance material having a transverse cross section of substantially the same shape as that of the object arranged at the end of the object and adapted to form a longitudinal extension of the object, whereby substantially uniform heat treatment from the said intermediate point to the end point of the object may be effected.

20. In combination an induction heat-treating head having an inducing coil of definite axial length arranged to be passed through a hollow cylindrical workpiece from outside of one end through and out of the other end, a holder for the workpiece, and a pair of annular end pieces of low magnetic reluctance carried by the holder arranged to form short hollow cylindrical extensions for each end of the workpiece effectively extending each end a distance equal to at least the entire axial length of the said coil.

21. In combination, an induction heat-treating head having an inducing coil of definite axial length arranged to be passed through at least a portion of a hollow cylindrical workpiece adjacent to and including an end thereof and for a short distance outside of the end, a holder for the workpiece and an annular end of low magnetic reluctance carried by the holder arranged to form a short hollow cylindrical extension for the end of the workpiece, effectively extending the end a distance equal to at least the entire axial length of the coil.

22. In combination, an inductive heating coil arranged to move into and out of inductive relation with a workpiece, and a magnetic circuit element of low reluctance, means for holding said circuit element and the workpiece in end-to-end relation during the entire heat treating operation of the end of the workpiece, said heating coil being arranged to move into operative relation with said magnetic circuit element upon movement out of inductive relation with the workpiece to effect uniform heat treatment of the end of the workpiece during said movement.

23. In combination, an inductive heat-treating head having an inducing coil of definite axial length arranged to inductively heat treat a surface of a metallic object to be heat treated at least adjacent an end thereof, a core element coaxial with said coil, and means of low magnetic reluctance adapted to be associated adjacent the said end of the object in end extension relation therewith to provide, upon disposition of said coil adjacent the said end of the object in inductive heating relation with the said surface thereof, a low reluctance magnetic circuit for said coil consisting in series said core element, the adjacent axial extent of the object and the said end extension, whereby uniform heat-treatment of the said surface at the said end may be effected.

HOWARD E. SOMES.